3,243,430
CERTAIN SUBSTITUTED DIBENZO DIAZOCINES AND THEIR PREPARATION

Werner Metlesics, Clifton, and Leo Henryk Sternbach, Upper Montclair, N.J., assignors to Hoffmann-La Roche Inc., Nutley, N.J., a corporation of New Jersey
No Drawing. Filed Mar. 1, 1965, Ser. No. 436,317
19 Claims. (Cl. 260—239)

This application is a continuation-in-part of application Serial No. 263,411, filed March 7, 1963, now abandoned.

The present invention relates to diazocine derivatives. More particularly, it relates to substituted diphenyldibenzo[b.f][1,5]diazocines.

The diazocines of the invention have the formula

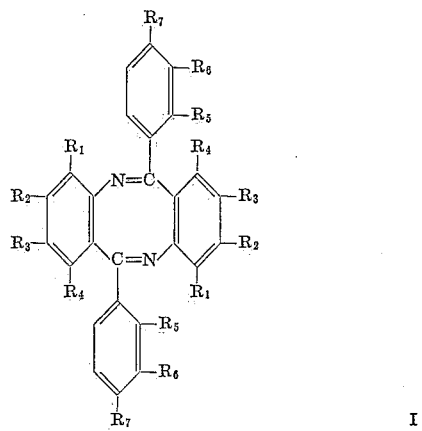

wherein $R_1$ through $R_4$ are hydrogen, halogen, e.g. F, Cl, or Br, lower alkoxy, lower alkylthio, or trifluoromethyl; and $R_1$ through $R_4$ can be the same or different, except that at least one of $R_1$ through $R_4$ must be selected from halogen, lower alkoxy, lower alkylthio or trifluoromethyl; and $R_5$ through $R_7$ are hydrogen, halogen, e.g. F, Cl, or Br, lower alkoxy, lower alkylthio, lower alkyl, or trifluoromethyl and $R_5$ through $R_7$ can be the same or different.

The compounds of Formula I exhibit antigonadotropic, serum cholesterol lowering, and estrogenic activity, and are useful as antigonadotropins, serum cholesterol lowering agents, and estrogens.

Preferred diazocines of the invention have the formula

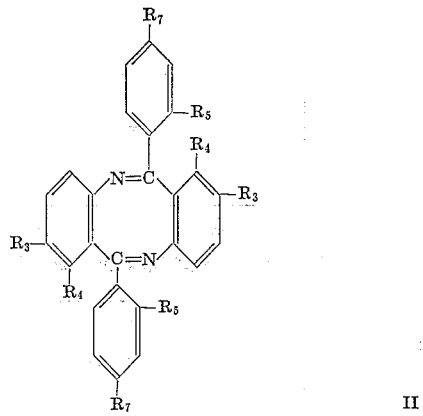

wherein $R_3$, $R_4$, $R_5$ and $R_7$ have the meanings given above and wherein at least one of $R_3$ and $R_4$ is halogen, trifluoromethyl, lower alkoxy, lower alkylthio.

The above preferred compounds have marked estrogenic activity. Additionally, many of them also have marked antigonadotropic and/or serum cholesterol lowering activity. For example, both 2,8-dichloro-6,12-diphenyldibenzo[b,f][1,5]diazocine and 2,8-dibromo-6,12-diphenyldibenzo[b,f][1,5]diazocine have marked activity as both serum cholesterol lowering agents and antigonadotropins; 2,8 - di(trifluoromethyl) - 6,12 - diphenyldibenzo[b,f][1,5]diazocine has marked activity as a serum cholesterol lowering agent; and 1,7-dichloro-6,12-diphenyldibenzo[b,f][1,5]diazocine, 2,8 - dichloro-6,12-di(o-methoxyphenyl)-dibenzo[b,f][1,5]diazocine, and 2,8 - dichloro - 6,12-di(p-fluorophenyl)-dibenzo[b,f][1,5]diazocine have marked activity as antigonadotropins; etc.

The term "lower alkyl" used in the specification and claims is to be understood to mean a straight or branched chain alkyl group having from 1 to 7 carbon atoms, e.g., methyl, ethyl, propyl, butyl, isopropyl, hexyl, heptyl, etc.

The compounds of Formula I are prepared by treating a substituted aminobenzophenone of the formula

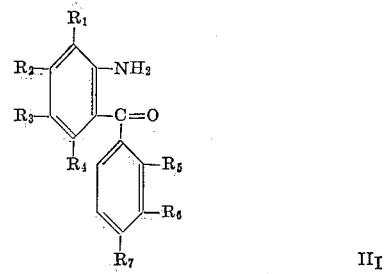

wherein $R_1$ through $R_7$ have the meaning given above, in a solvent, in the presence of a Friedel-Crafts catalyst, such as, for example, $AlCl_3$, $TiCl_4$, $SnCl_4$, $SbCl_3$, $BF_3$, etc. Also, combinations of the above catalysts can be employed, for example, $BF_3$ plus $TiCl_4$, etc.

The solvent employed in the above reaction is preferably an inert organic solvent, for example, an aliphatic or aromatic hydrocarbon solvent, e.g., petroleum ether, benzene, toluene, etc.; a halogenated hydrocarbon, e.g., tetrachloroethane, chlorobenzene, etc.

The temperature of the reaction is not critical, although temperatures in the range of from about 60° C. to about 160° C. are usually employed. Lower temperatures can be used, although the reaction time will be increased. Also, higher temperatures can be used, although temperatures above which the reactant or the product decomposes should of course not be employed. The reaction time is not critical, although times in the range of thirty minutes to twenty hours are generally employed.

Among the Friedel-Crafts catalysts suitable for use in the above-described process, $BF_3$ and $TiCl_4$ as well as mixtures of these two are specifically distinguishable owing to the superior yield of product which is obtained when these catalysts are employed.

A preferred process for carrying out the preparation of the compounds of Formula I is to reflux an aminobenzophenone of Formula III in chlorobenzene in the presence of $BF_3$, $TiCl_4$ or a mixture of $BF_3$ and $TiCl_4$.

Alternatively, the compounds of Formula I can be prepared by treating a compound of Formula III in a solvent in the presence of a strong base catalyst such as, for example, alkali metal hydrides and alkali metal amides, e.g., sodium hydride, sodamide, potassium amide, etc., alkali metal alkoxides, e.g., sodium methoxide, potassium butoxide, etc. The preferred base catalysts are sodium hydride and sodamide. Preferred solvents employed in this process aspect of the invention are the inert organic solvents such as, for example, aromatic hydrocarbons, e.g., xylene, toluene, etc., ethers, e.g., tetrahydrofuran, etc., and the like. The reaction is conveniently carried out at temperatures in the range of about 60° C. to about 160° C. though higher or lower temperatures can also be used.

A preferred method for carrying out the above-described base catalyzed reaction comprises refluxing a solution of a compound of Formula III in tetrahydrofuran in the presence of sodium hydride.

Other related processes can be employed to form the compounds of Formula I; for example, the aminobenzophenone of Formula III can be heated with polyphosphoric acid. Also, compounds of Formula I wherein one or more of the R groups is nitro (which compounds can be obtained by the above processes by employing a starting material of Formula III wherein one of the $R_1$–$R_7$ groups is nitro) can be converted to the corresponding halo derivative by reducing the nitro groups to amino groups, e.g. by hydrogenation; diazotizing the amino compound with nitrous acid or an equivalent to form the diazonium salt; and converting the diazonium salt into the corresponding halogen substituted compound by known methods, e.g. by a Sandmeyer reaction or a Schiemann reaction.

Hence, the nitro intermediates of the invention have the formula

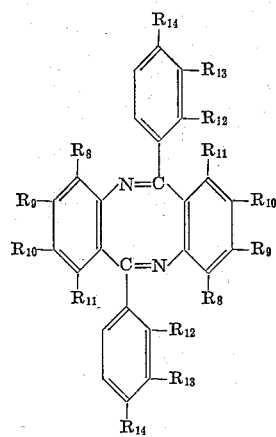

IV wherein $R_8$, $R_9$, $R_{10}$ and $R_{11}$ are hydrogen, halogen, e.g. F, Cl or Br, lower alkoxy, lower alkylthio, trifluoromethyl or nitro, except that at least one of these groups must be other than hydrogen, and $R_{12}$, $R_{13}$ and $R_{14}$ are hydrogen, halogen, e.g. F, Cl or Br, lower alkoxy, lower alkylthio, lower alkyl, trifluoromethyl, or nitro, wherein at least one of the $R_8$ through $R_{14}$ groups is nitro.

The amino intermediates are identical with the above except that amino is present in place of nitro.

The invention will be better understood by reference to the following examples, which are given for illustration purposes only and are not meant to limit the invention.

EXAMPLE 1

*Preparation of 2,8-dichloro-6,12-diphenyldibenzo [b,f][1,5]diazocine*

23.2 g. (0.10 m.) of 5-chloro-2-amino benzophenone is added in small portions to a stirred, cooled suspension of 0.10 mole of aluminum chloride in 300 ml. of chlorobenzene. After the addition, the mixture is heated, whereupon a large quantity of hydrogen chloride evolves and a dark solution forms. The mixture is refluxed for 3 hours, then cooled, poured on a sufficient quantity of ice, made basic with aqueous sodium hydroxide, and extracted with dichloromethane. The extract is washed with water and dried over anhydrous sodium sulfate. The solvent is removed under vacuum giving a residue which crystallizes upon addition of ethanol. The crystalline residue is recrystallized from a mixture of dichloromethane and ethanol to give 2,8-dichloro-6,12-diphenyldibenzo [b,f][1,5]diazocine in the form of yellow prisms, having a melting point of 215–217° C.

EXAMPLE 2

*Preparation of 2,8-dinitro-6,12-diphenyldibenzo [b,f][1,5]diazocine*

The procedure of example 1 is followed except that 12.1 g. (0.05 m.) of 5-nitro-2-aminobenzophenone is employed together with 0.05 m. of aluminum chloride and 170 ml. of chlorobenzene. The mixture is refluxed for 2 hours and 45 minutes, and after work up as in Example 1, 2,8 - dinitro - 6,12-diphenyl-dibenzo[b,f][1,5]diazocine having a melting point of 291–294° C. is obtained.

EXAMPLE 3

The compounds given in the table below are all prepared by the following procedure:

To a 2-aminobenzophenone of Formula III wherein the R groups have the meaning given in Table I below, dissolved in chlorobenzene, is added boron fluoride ethyl ether and the resulting solution refluxed for the time indicated in the table. After cooling, the solution is diluted with dichloromethane and washed with aqueous sodium hydroxide. Evaporation in vacuo gives a crystalline residue which, upon recrystallization from a mixture of dichloromethane and alcohol, yields yellow prisms having the melting point shown in Table I below:

TABLE I

| 2-aminobenzophenone (all R groups not given below are hydrogen) | Quantity of 2-aminobenzophenone | | Catalyst, $BF_3 \cdot Et_2O$ | | Vol. of chlorobenzene in ml. | Reaction time in hrs. | Product | M.P., °C. |
|---|---|---|---|---|---|---|---|---|
| | G. | Moles | Ml. | Moles | | | | |
| $R_3$=Cl | 23.2 | 0.10 | 1.3 | 0.01 | 100 | 16 | 2,8-dichloro-6,12-diphenyldibenzo[b,f] [1,5] diazocine. | 215–217 |
| $R_3$=F | 0.5 | 0.0023 | 0.05 | 0.0004 | 15 | 17 | 2,8-difluoro-6,12-diphenyldibenzo [b,f] [1,5] diazocine. | 187–189 |
| $R_3$=Br | 6.9 | 0.025 | 0.4 | 0.003 | 25 | 16 | 2,8-dibromo-6,12-diphenyldibenzo [b,f] [1,5] diazocine. | 229–232 |
| $R_3$=OCH$_3$ | 3.9 | 0.018 | 0.2 | 0.0015 | 80 | 6 | 2,8-dimethoxy-6,12-diphenyldibenzo [b,f] [1,5] diazocine. | 202–204 |
| $R_3$=Br, $R_5$=F | 5.9 | 0.02 | 0.5 | 0.0039 | 20 | 16 | 2,8-dibromo-6,12-bis(o-fluorophenyl)-dibenzo [b,f] [1,5] diazocine. | 230–232 |
| $R_3$=Cl, $R_5$=OCH$_3$ | 1.0 | 0.0038 | 0.1 | 0.0008 | 15 | 16 | 2,8-dichloro-6,12-bis(o-methoxyphenyl)-dibenzo [b,f] [1,5] diazocine. | 256–258 |
| $R_3$=Cl, $R_6$=Cl | 13.3 | 0.05 | 0.7 | 0.0055 | 50 | 16 | 2,8-dichloro-6,12-bis(m-chlorophenyl)-dibenzo ([b,f] [1,5] diazocine. | 189–192 |
| $R_3$=Cl, $R_7$=F | 2.7 | 0.011 | 0.25 | 0.0020 | 15 | 16 | 2,8-dichloro-6,12-bis(p-fluorophenyl)-dibenzo [b,f] [1,5] diazocine. | 250–252 |
| $R_2$=Cl | 46.4 | 0.20 | 2.6 | 0.020 | 200 | 16 | 3,9-dichloro-6,12-diphenyldibenzo [b,f] [1,5] diazocine. | 253–254 |
| $R_4$=Cl | 11.6 | 0.05 | 0.65 | 0.005 | 50 | 16 | 1,7-dichloro-6,12-diphenyldibenzo [b,f] [1,5] diazocine. | 242–243 |
| $R_2$=Cl, $R_3$=Cl | 8.0 | 0.03 | 0.4 | 0.003 | 30 | 16 | 2,3,8,9-tetrachloro-6,12-diphenyldibenzo [b,f] [1,5] diazocine. | 348–350 |

EXAMPLE 4

The procedure of Example 3 is carried out with the compounds given in Table I except that xylene is used as solvent in place of chlorobenzene. The time required (usually 4–6 hours) for the reaction is indicated by the amount of water collected in a Dean Stark trap.

EXAMPLE 5

The procedure of Example 3 is carried out except that titanium tetrachloride is employed in place of boron fluoride ethyl ether.

low prisms which after recrystallization from a mixture of dichloromethane and ether melts at 268–270°. After resolidification the melting point is 278–280°, probably due to dimorphism.

(B) *Preparation of 2,8-difluoro-6,12-diphenyldibenzo [b,f][1,5]diazocine*

A solution of 1.4 g. (0.02 moles) of sodium nitrite in 15 ml. of water is added dropwise to a solution of 3.9 g. (0.01 mole) of 2,8-diamino-6,12-diphenyldibenzo[b,f] [1,5]diazocine in 125 ml. of ca. 0.5 N hydrochloric acid.

TABLE II

| 2-aminobenzophenone (all R groups not given below are hydrogen) | Quantity of 2-aminobenzophenone | | Catalyst, TiCl₄ | | Vol. of chlorobenzene in ml. | Reaction time in hrs. | Product | M.P., °C. |
|---|---|---|---|---|---|---|---|---|
| | G. | Moles | Ml. | Moles | | | | |
| $R_3$=Cl | 23.2 | 0.10 | 5.2 | 0.047 | 100 | 16 | 2,8-dichloro-6,12-diphenyldibenzo [b,f] [1,5] diazocine. | 215–217 |
| $R_3$=F | 10.8 | 0.05 | 2.6 | 0.024 | 50 | 16 | 2,8-difluoro-6,12-diphenyldibenzo [b,f] [1,5] diazocine. | 187–189 |
| $R_3$=CF₃ | 13.3 | 0.05 | 2.2 | 0.02 | *150 | 2 | 2,8-bis(trifluoromethyl)-6,12-diphenyldibenzo [b,f] [1,5] diazocine. | 202–205 |
| $R_3$=$R_5$=Cl | 13.3 | 0.05 | 2.7 | 0.025 | 50 | 16 | 2,8-dichloro-6,12-bis(o-chlorophenyl)-dibenzo [b,f] [1,5] diazocine. | 211–213 |
| $R_3$=Cl, $R_5$=CH₃ | 2.4 | 0.01 | 0.4 | 0.004 | 10 | 16 | 2,8-dichloro-6,12-di-o-tolyldibenzo [b,f] [1,5] diazocine. | 185–187 |
| $R_3$=NO₂ | 24.2 | 0.10 | 5.8 | 0.053 | 100 | 16 | 2,8-dinitro-6,12-diphenyldibenzo [b,f] [1,5]-diazocine. | 291–294 |
| $R_3$=SC₂H₅ | 5.4 | 0.02 | 1.1 | 0.010 | 20 | 16 | 2,8-bis(ethylthio)-6,12-diphenyldibenzo [b,f] [1,5] diazocine. | 123–125 |

*Benzene was used in this case instead of chlorobenzene.

EXAMPLE 6

The procedure employed is identical to that given for Example 3 except that a mixture of boron fluoride ethyl ether and titanium tetrachloride is used as catalyst. The results are given in Table III below.

During the addition the temperature is kept at 5° C. To this solution fluoroboric acid, prepared from 2.6 g. boric acid and 7 g. of 48 percent hydrofluoric acid is added with cooling and stirring. A solid precipitates, which, after 30 minutes, is collected on a filter and washer with water.

TABLE III

| 2-aminobenzophenone (all R groups not given below are hydrogen) | Quantity of 2-aminobenzophenone | | Catalysts in ml. | Vol. of C₆H₅Cl in ml. | Reaction time in hrs | Product | M.P., °C. |
|---|---|---|---|---|---|---|---|
| | G. | Moles | | | | | |
| $R_1$=Cl | 5.8 | 0.025 | 1.5 BF₃ / 1.3 TiCl₄ | 25 | 16 | 4,10-dichloro-6,12-diphenyldibenzo-[b,f][1,5] diazocine. | 182–183 |
| $R_1$=$R_3$=Br | 18.0 | 0.05 | 3.2 BF₃ / 2.6 TiCl₄ | 50 | 16 | 2,4,8,10-tetrabromo-6,12-diphenyldibenzo-[b,f][1,5] diazocine. | 271–273 |
| $R_1$=$R_2$=$R_3$=$R_4$=Cl | 6.7 | 0.02 | 2.5 BF₃ / 1.5 TiCl₄ | 30 | 16 | 1,2,3,4,7,8,9,10-octachloro-6,12-diphenyldibenzo-[b,f][1,5] diazocine. | 336–338 |

EXAMPLE 7

*Preparation of 2,8-dichloro-6,12-diphenyldibenzo[b,f] [1,5]diazocine*

A solution of 9.25 g. (0.04 mole) of 2-amino-5-chlorobenzophenone in ca. 250 ml. of polyphosphoric acid is heated in a flask immersed in an oil bath (temp. 130–140°) for 18 hours. The mixture is cooled, poured on ice and extracted with ether. The ether solution is washed with aqueous sodium hydroxide, dried over sodium sulfate and evaporated. The residue crystallizes on addition of ethanol. After recrystallization from a mixture of dichloromethane and ethanol yellow prisms melting at 215° is obtained. This compound was in every respect identical with the product obtained in Example 1.

EXAMPLE 8

(A) *Preparation of 2,8-diamino-6,12-diphenyldibenzo [b,f][1,5]diazocine*

A solution of 2.2 g. (0.005 mole) of 2,8-dinitro-6,12-diphenyldibenzo[b,f][1,5]diazocine in 200 ml. of tetrahydrofuran is hydrogenated at 25° and atmospheric pressure using ca. 0.5 g. of Raney nickel as catalyst. After 1 hour the uptake of hydrogen was 630 ml. (ca. 0.026 mole) and the hydrogen absorption stops. The catalyst is separated by filtration and the solution is evaporated in vacuo. The residue crystallizes on addition of ether to form yellow prisms which after recrystallization from a mixture of dichloromethane and ether melts at 268-270°. After resolidification the melting point is 278-280°, probably due to dimorphism.

It is dried and distilled in a bulb tube (0.2 mm., bath temperature 250° C.) to give a yellow glass which crystallizes on scratching. Recrystallization from methanol gives crystals melting at 185–187°. The product is identical to that obtained by the method described in Example 3.

(C) *Preparation of 5,3'-dichloro-2-aminobenzophenone*

To 66.5 g. of p-chloroaniline is added slowly with stirring 100 g. of m-chlorobenzoyl chloride. The temperature is raised to 65° C. to complete the evolution of HCl gas and the temperature is then raised to 200° C. whereupon 66.5 g. of zinc chloride is added. Stirring is continued and the temperature is raised to 230–240° C. and maintained at this temperature for 2 hours. The reaction mixture is then poured onto a mixture of 1 l. of 0.5 n-HCl and 2 kg. of ice. The resulting crystalline mass is air dried and then suspended in 500 ml. of 0.5 n-HCl and refluxed. The solid material melts to an oil and the acidic aqueous phase is removed by decantation. This process of treating the solid material with 500 ml. of 0.5 HCl and refluxing is repeated two more times and the solid material then treated with 1 l. of water. The residue is then refluxed with 600 ml. of 85 percent H₂SO₄ at a temperature of 145–150° C. for 1½ hours and then poured onto ice. The mixture is then extracted with 6 l. of ether (portion wise) and the aqueous phase discarded. The ether layer is then washed with 0.5 n-HCl and then 3 times, each time with 1 l. of 5 n-NaOH, concentrated, dried over anhydrous sodium sulfate, filtered and concentrated under vacuum to yield 5,3'-dichloro-2-aminobenzophenone. Recrystallization from ethyl alcohol yields a product melting at 107–109° C.

The preparation of 2-benzoyl-3,4,5,6-tetrachloroaniline is given hereinafter for purpose of completeness, although it is to be understood that this compound and the process for its preparation do not comprise part of the invention disclosed and claimed herein.

(D) *Preparation of 2-benzoyl-3,4,5,6-tetrachloroaniline*

85 g. of 2-benzoyl-3,4,5,6-tetrachlorobenzoic acid is suspended in 170 ml. of thionyl chloride in a flask equipped with a stirrer and reflux condenser, and connected to a gas scrubbing system. After heating and stirring for ½ hour on a steam bath, the solid dissolves, but little gas evolution occurs. Upon the addition of a few drops of dimethyl formamide, vigorous evolution of sulfur dioxide and hydrogen chloride takes place. After heating for an hour, the mixture is cooled and 250 ml. of petroleum ether (B.P. 60–90° C.) is added, whereupon crystalline 2-benzoyl-3,4,5,6-tetrachlorobenzoyl chloride separates. After chilling in an ice bath for an hour, the crystals are filtered off and washed with petroleum ether. The product has a melting point of 184–185° C.

75 g. of 2-benzoyl-3,4,5,6-tetrachlorobenzoyl chloride is stirred for 18 hours in a mixture of 4 l. of ethyl alcohol and 4 l. of concentrated ammonium hydroxide. The solid is then filtered off, the filtrate diluted with 4 l. of water and the precipitate that forms added to the originally obtained filter cake. The filter cake, which is 2-benzoyl-3,4,5,6-tetrachlorobenzamide, after washing well with water, melts at 260–265° C. After recrystallization from 8 l. of 60 percent aqueous alcohol, crystalline product is obtained melting at 270–274° C. Upon further recrystallization, the melting point rises to 272–274° C.

In a flask equipped with a stirrer, thermometer and reflux condenser is placed 58 g. of 2-benzoyl-3,4,5,6-tetrachlorobenzamide, 58 g. of potassium hydroxide dissolved in 2800 ml. of methanol, and 105 ml. of sodium hypochlorite solution, assaying 16.8 percent active chlorine. The stirred suspension is warmed to 45–50° C., and maintained at this temperature for about 10 minutes. Then the solution is refluxed for 1 hour, 58 ml. of glacial acetic acid is added, the condenser is changed for downward distillation, and 2 l. of methanol distilled off. One l. of water is added to the residue and the mixture is chilled. The resulting yellow solid is filtered off, washed well with water, and dried in vacuo over calcium chloride to yield 2-carbomethoxyamino-3,4,5,6-tetrachlorobenzophenone of melting point 200–204° C. Upon recrystallization from acetic acid, the product is obtained in the form of bright yellow needles melting at 207–208° C.

61 g. of 2-carbomethoxyamino-3,4,5,6-tetrachlorobenzophenone is added to a solution of 183 g. of potassium hydroxide in 2 l. of methanol and 1 l. of water in a flask equipped with a stirrer and condenser set for downward distillation. The solution is warmed, methanol distills out, and a crystalline yellow precipitate forms. Distillation is continued until the vapor temperature reaches 98° C. The residue is then chilled and the yellow precipitate is filtered off and washed free of alkali with water. The dry 2-benzoyl-3,4,5,6-tetrachloroaniline melts at 172–177° C. Upon recrystallization from ethanol, the product is obtained as bright lemon-yellow crystals melting at 173–174° C.

EXAMPLE 9

*Based catalyzed preparation of 2,8-dichloro-6,12-diphenyl-dibenzo[b,f][1,5]diazocine*

To a solution of 4.6 g. (0.02 mole) of 2-amino-5-chlorobenzophenone in 40 ml. of tetrahydrofuran was added 1.2 g. (0.025 mole) of a 50 percent suspension of sodium hydride in mineral oil. The mixture was heated to reflux for 6 hours and cooled. Methanol was added and the solution was concentrated on a steam bath. The crystals which precipitated melted at 216–218° and were identified as 2,8-dichloro-6,12-diphenyl-dibenzo[b,f][1,5[diazocine.

We claim:
1. A compound of the formula

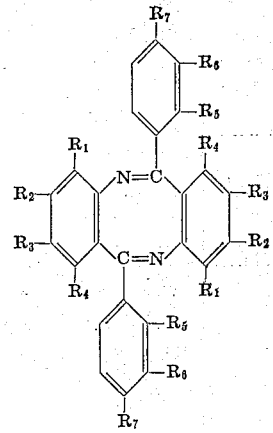

wherein $R_1$, $R_2$, $R_3$ and $R_4$ are selected from the group consisting of hydrogen, halogen, lower alkoxy, lower alkylthio and trifluoromethyl, except that at least one of $R_1$, $R_2$, $R_3$ and $R_4$ is other than hydrogen; and $R_5$, $R_6$ and $R_7$ are seelcted from the group consisting of hydrogen, halogen, lower alkoxy, lower alkylthio, lower alkyl and trifluoromethyl.

2. A compound of the formula

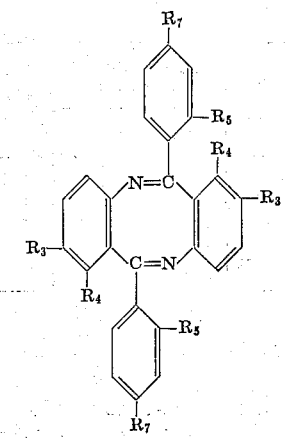

wherein $R_3$ and $R_4$ are selected from the group consisting of hydrogen, halogen, lower alkoxy, lower alkylthio and trifluoromethyl, except that at least one of $R_3$ and $R_4$ is other than hydrogen, and $R_5$ and $R_7$ are selected from the group consisting of hydrogen, halogen, lower alkoxy, lower alkylthio, lower alkyl and trifluoromethyl.

3. 2,8-dichloro-6,12-diphenyldibenzo[b,f][1,5] diazocine.

4. 2,8-dibromo-6,12-diphenyldibenzo[b,f][1,5] diazocine.

5. 2,8-bis(trifluoromethyl)-6,12-diphenyldibenzo[b,f][1,5] diazocine.

6. 2,8-dichloro-6,12-bis(o-methoxyphenyl)dibenzo[b,f][1,5] diazocine.

7. 2,8-dichloro-6,12-bis(p-fluorophenyl)dibenzo[b,f][1,5] diazocine.

8. 1,7-dichloro-6,12-diphenyldibenzo[b,f][1,5] diazocine.

9. 2,8-dichloro-6,12-di-o-tolyldibenzo[b,f][1,5] diazocine.

10. A compound having the formula

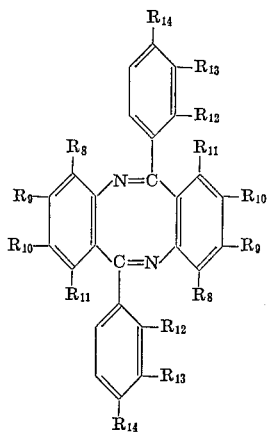

wherein $R_8$ through $R_{11}$ are selected from the group consisting of hydrogen, halogen, lower alkoxy, lower alkylthio, trifluoromethyl, nitro and amino; and $R_{12}$ through $R_{14}$ are selected from the group consisting of hydrogen, halogen, lower alkoxy, lower alkylthio, lower alkyl, trifluoromethyl, nitro and amino; wherein at least one of $R_8$ through $R_{11}$ is other than hydrogen, and wherein at least one of $R_8$ through $R_{14}$ is selected from the group consisting of nitro and amino.

11. 2,8 - dinitro - 6,12 - diphenyldibenzo[b,f][1,5] diazocine.

12. 2,8 - dinitro - 6,12 - diphenyldibenzo[b,f][1,5] diazocine.

13. A process for preparing a compound of the formula

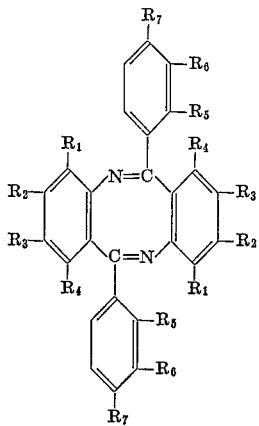

wherein $R_1$, $R_2$, $R_3$ and $R_4$ are selected from the group consisting of hydrogen, halogen, lower alkoxy, lower alkylthio and trifluoromethyl, except that at least one of $R_1$, $R_2$, $R_3$ or $R_4$ is other than hydrogen; and $R_5$, $R_6$ and $R_7$ are selected from the group consisting of hydrogen, halogen, lower alkoxy, lower alkylthio, lower alkyl and trifluoromethyl, comprising the steps of reacting a compound to the formula

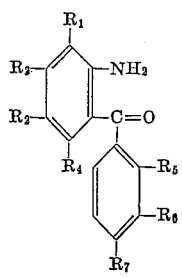

wherein $R_1$ through $R_4$ have the meaning given above, in a solvent in the presence of a Friedel-Crafts catalyst.

14. A process according to claim 13 wherein said solvent is selected from the group consisting of hydrocarbon and halogenated hydrocarbon solvents.

15. A process according to claim 13 wherein the reaction temperature is selected from the range of about 60 to about 160° C.

16. A process according to claim 13 wherein the catalyst is a compound selected from the group consisting of $BF_3$, $TiCl_4$ and mixtures of $BF_3$ and $TiCl_4$.

17. A process according to claim 13 wherein polyphosphoric acid is employed in place of the Friedel-Crafts catalyst.

18. A process for preparing a compound of the formula

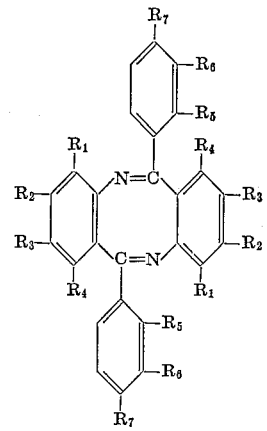

wherein $R_1$, $R_2$, $R_3$ and $R_4$ are selected from the group consisting of hydrogen, halogen, lower alkoxy, lower alkylthio and trifluoromethyl, except that at least one of $R_1$, $R_2$, $R_3$ or $R_4$ is other than hydrogen; and $R_5$, $R_6$ and $R_7$ are selected from the group consisting of hydrogen, halogen, lower alkoxy, lower alkylthio, lower alkyl and trifluoromethyl, comprising the steps of reacting a compound of the formula

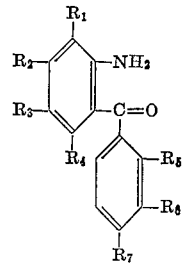

wherein $R_1$ through $R_4$ have the meaning given above, in a solvent in the presence of a strong base catalyst selected from the group consisting of alkali metal hydrides, alkali metal amides and alkali metal alkoxides.

19. The process of claim 18 wherein the strong base is a member selected from the group consisting of sodium hydride and sodamide.

References Cited by the Examiner

Hickenbottom: Reactions of Organic Compounds, London (1948), pages 314–316, 343–350, and 372–377.

Patent Journal, Republic of South Africa, vol. 1, page 30 (in English), June 21, 1961.

HENRY R. JILES, *Primary Examiner.*

ALTON D. ROLLINS, *Assistant Examiner.*